United States Patent
Ebihara

(10) Patent No.: US 9,511,464 B2
(45) Date of Patent: Dec. 6, 2016

(54) ADJUSTMENT MECHANISM FOR ROTATION RUNOUT AND DYNAMIC BALANCE OF ROTATING TOOL

(71) Applicant: FANUC Corporation, Yamanashi (JP)

(72) Inventor: Kenzo Ebihara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 147 days.

(21) Appl. No.: 14/598,763

(22) Filed: Jan. 16, 2015

(65) Prior Publication Data
US 2015/0202728 A1 Jul. 23, 2015

(30) Foreign Application Priority Data
Jan. 20, 2014 (JP) ................. 2014-008070

(51) Int. Cl.
*B23Q 11/00* (2006.01)
*B23Q 15/22* (2006.01)
*B23Q 17/22* (2006.01)
*G05B 19/19* (2006.01)
*B23Q 17/00* (2006.01)

(52) U.S. Cl.
CPC .......... *B23Q 11/0035* (2013.01); *B23Q 15/22* (2013.01); *B23Q 17/2216* (2013.01); *G05B 19/19* (2013.01); *B23Q 2017/001* (2013.01); *Y10T 279/11* (2015.01); *Y10T 279/21* (2015.01)

(58) Field of Classification Search
CPC ...... Y10T 279/11; Y10T 279/21; G05B 19/19; B23Q 11/0035; B23Q 15/22; B23Q 17/2216; B23Q 2017/001

USPC .................. 33/636, 637, 638, 639, 640, 642
See application file for complete search history.

(56) References Cited

U.S. PATENT DOCUMENTS

| 2,495,487 | A | * | 1/1950 | St Germain | ....... B23Q 17/2266 33/638 |
| 4,030,201 | A | * | 6/1977 | Possati | ................... G01B 5/252 33/504 |
| 4,553,331 | A | * | 11/1985 | Salaam | ................... G01B 5/25 33/533 |
| 4,745,673 | A | * | 5/1988 | Araki | ................... B23B 31/263 29/26 A |
| 4,926,337 | A | * | 5/1990 | Gile | ....................... B23Q 3/183 279/133 |
| 5,591,008 | A | | 1/1997 | Wrobel et al. | |

(Continued)

FOREIGN PATENT DOCUMENTS

| JP | 58-211845 A | 12/1983 |
| JP | 2005-131774 A | 5/2005 |

(Continued)

OTHER PUBLICATIONS

Office Action mailed Mar. 10, 2015, corresponding to Japanese patent application No. 2014-008070.

*Primary Examiner* — G. Bradley Bennett
(74) *Attorney, Agent, or Firm* — Hauptman Ham, LLP

(57) ABSTRACT

A tool holder holding a rotating tool can be sucked in a direction of a rotational axis of a spindle and a direction perpendicular to the direction of the rotational axis, using a chuck. A projection is provided on an outer peripheral surface of the tool holder, and caused to collide against another projection with the spindle kept rotating, to displace the tool holder. Thus, runout and dynamic balance of the rotating tool are adjusted.

8 Claims, 12 Drawing Sheets

(56) References Cited

U.S. PATENT DOCUMENTS

| | | | | |
|---|---|---|---|---|
| 6,095,728 | A * | 8/2000 | Howie | B23Q 17/22 |
| | | | | 33/638 |
| 2001/0034950 | A1* | 11/2001 | Bender | B23B 29/03403 |
| | | | | 33/636 |
| 2004/0177366 | A1 | 9/2004 | Han | |
| 2004/0207356 | A1* | 10/2004 | Endo | G05B 19/182 |
| | | | | 318/574 |
| 2008/0101881 | A1 | 5/2008 | Hon et al. | |
| 2010/0024233 | A1* | 2/2010 | Boland | B23Q 15/22 |
| | | | | 33/628 |
| 2011/0232118 | A1* | 9/2011 | Hon | G01B 3/008 |
| | | | | 33/559 |
| 2015/0145193 | A1* | 5/2015 | Ogawa | B23Q 17/005 |
| | | | | 269/24 |
| 2015/0202729 | A1* | 7/2015 | Lin | B23Q 17/2225 |
| | | | | 33/639 |

FOREIGN PATENT DOCUMENTS

| | | |
|---|---|---|
| JP | 4276252 B2 | 6/2009 |
| JP | 2009-248212 A | 10/2009 |
| JP | 2012-86279 A | 5/2012 |

\* cited by examiner

TOOL HOLDER IS CHUCKED IN DIRECTION IN WHICH FIRST PROJECTION 19a IS SET IN Y DIRECTION WHEN SPINDLE HAS ROTATION ANGLE OF 0°.
TOOL HOLDER IS DECENTERED TOWARD FIRST PROJECTION 19b POSITIONED AT ROTATION ANGLE OF 90°.

16 TAP HOLES FOR
BALANCE SCREWS

VIEWED IN DIRECTION
OF ARROW C

ADJUSTMENT MECHANISM FOR ROTATION RUNOUT AND DYNAMIC BALANCE OF ROTATING TOOL

RELATED APPLICATIONS

The present application claims priority to Japanese Application Number 2014-008070, filed Jan. 20, 2014, the disclosure of which is hereby incorporated by reference herein in its entirety.

BACKGROUND OF THE INVENTION

1. Field of the Invention

The present invention relates to an adjustment mechanism for rotation runout and dynamic balance of a rotating tool.

2. Description of the Related Art

A spindle includes a spindle shaft to which a rotating tool is attached. In a machine tool, the rotating tool is generally attached to the spindle shaft using a collet chuck or a shrinkage fitting chuck. These chuck structures are subjected to little positional displacement, and the chucks have sufficient strengths.

In particular, spindles used for ultra-precision machining use an air bearing in order to reduce heat from and vibration in the bearing of the spindle shaft. The air bearing offers only low resistance to a heavy load, and thus, the bearing may be damaged when the spindle shaft is rotated at high speed with significant unbalance present. Thus, each time the balance is corrected, the rotation speed of the spindle shaft needs to be increased. The adjustment needs to be repeated until dynamic balance correction at the maximum operating rotation speed is finally completed. This is a time-consuming operation.

A conventional method for adjusting the dynamic balance will be described with reference to FIG. 16A and FIG. 16B.

A spindle 5 depicted in FIG. 16A includes a collet chuck (a tool holder 3 for the collet chuck) attached directly to a spindle shaft 4. Thus, the spindle 5 includes no mechanism adjusting runout of the tool. As depicted in FIG. 16A, when the dynamic balance is adjusted, a vibration sensor 63 and a rotation sensor 65 are attached to the spindle 5. Then, the spindle shaft 4 of the spindle 5 is rotated, and a dynamic balance measurement apparatus 61 is used to perform measurement.

The dynamic balance measurement apparatus 61 indicates how much weight should be added to which rotational phase. As depicted by arrow 67, the collet chuck (the tool holder 3 for the collet chuck) has 16 tap holes 35 formed in an end surface of the collet chuck at intervals of 22.5° and into which balance screws (not depicted in the drawings) are fitted in a threaded manner, as depicted in FIG. 16B. A balance screw (set screw) with a specified weight is placed in a tap hole closest to a phase specified by the dynamic balance measurement apparatus 61, to correct the balance. Thus, during the correction, the rotation of the spindle inevitably needs to be stopped.

Desirably, for rotating tools used for an ultra-precision machine, positional displacement in a direction orthogonal to the rotational axis is limited to 1 μm or less, and deviation of the dynamic balance during rotation is limited to 10 mg or less. The collet chuck and the shrinkage fitting chuck have structures unlikely to be displaced at the time of attachment but are not configured to be able to correct displacement. Furthermore, in the structures of these chucks, it is difficult to limit the positional displacement in the direction orthogonal to the rotational axis to 1 μm or less and to limit the deviation of the dynamic balance during rotation to 10 mg or less. The attachment of a weight for balance allows the dynamic balance to be manually adjusted but leads to the need to stop rotation of the spindle shaft each time the weight is attached. Automating the attachment and detachment of the weight is also difficult.

SUMMARY OF THE INVENTION

With the above-described problems of the conventional technique in view, it is an object of the present invention to provide an adjustment mechanism for rotation runout and dynamic balance of a rotating tool which mechanism enables the positions of a rotating tool and a tool holder to be displaced with a spindle kept rotating to allow the rotation runout and dynamic balance of the rotating tool to be adjusted.

According to the present invention, a tool is attached to a dedicated tool holder, which is then attached to a spindle using a vacuum chuck or a magnetic chuck. The tool holder includes a plurality of projections provided along an outer periphery of the tool holder and which have different phases in a rotation direction and different positions in the direction of a rotational axis. When the spindle is rotated, the projections are brought into abutting contact with a stationary section to displace the attachment of the tool holder in any direction. The displacement of the tool holder can be facilitated by reducing the degree of vacuum or reducing the force of the magnetic chuck using an air pressure, only during adjustment. In this regard, rotating the spindle means rotating the spindle shaft of the spindle.

The adjustment mechanism for rotation runout and dynamic balance of the rotating tool according to the present invention includes a spindle to which the rotating tool is attached, a tool holder that holds the rotating tool, a chuck which sucks the tool holder in a direction of a rotational axis of the spindle and which sucks the tool holder in a direction perpendicular to the direction of the rotational axis of the spindle, a first projection provided on an outer peripheral surface of the tool holder, a second projection provided on a plane formed by a trajectory of the first projection when the spindle is rotated, and distance change means that enables any change in a distance from the rotational axis of the spindle to the second projection until the first projection and the second projection collide against each other.

In the adjustment mechanism according to the present invention, a vacuum chuck or a magnetic chuck simply attaches the tool holder to the spindle by a suction force. Thus, application of an external force enables a position relative to the rotational axis to be displaced, allowing decentering of the tool or deviation of the dynamic balance to be corrected. Utilization of a permanent magnet for the magnetic chuck prevents the tool from falling even when power outage occurs. Since the second projection is located on the same rotation plane as that on which the first projection is located, the first projection and the second projection collide against each other when the relative distance between the rotational axis of the spindle and the second projection is reduced. A collision during rotation causes the first projection to be pushed to apply an external force to the tool holder, the position of which is displaced. In general, an object can be moved a very short distance more easily by hitting the object (exerting intermittent impacts on the object) than by applying a static force to the object. The projection on the rotating section causes intermittent pushes in synchronism with rotation, resulting in an automatic quick hitting operation.

A plurality of the first projections may be disposed on the outer peripheral surface of the tool holder so as to have different phases in the rotation direction. A plurality of rotation planes formed by the trajectories of the first projections are arranged so as not to overlap one another with the spindle kept rotating. Changing a relative position between the spindle and the second projection enables a position to be set where any one of the first projections and the second projection collide against each other.

In the embodiment, the first projections vary in the position in the direction of the rotational axis. Thus, with the spindle rotating, any projection can exclusively be pushed (to collide against the second projection) in synchronism with rotation. Furthermore, since the first projections vary in the phase in the rotation direction, the tool holder is displaced only in the direction in which the first projection is pushed. Thus, the direction in which the rotating tool holder is displaced can be selected depending on which of the first projections is pushed.

A number of the first projection may be four, and the first projections may have phases different from one another by 90° in the rotation direction.

In the embodiment, when four first projections are provided which have phases shifted by 90°, if any one of the first projections is pushed and excessively displaced, this first projection can be displaced in the opposite direction by pushing a projection with a phase different from the phase of the first projection by 180°. Alternatively, another projection may be pushed to push the first projection in an orthogonal direction. Thus, the tool holder can be displaced in any direction. The number of the second projections need not necessarily be the same as the number of the first projections but may be one.

The spindle and the dynamic balance adjustment mechanism may be mounted in a machine tool to allow any change in a relative distance between the first projection and the second projection using a translation axis or a rotational axis of the machine tool.

The embodiment utilizes the shaft of the machine tool to eliminate the need for a separate structure (which, for example, drives the second projection using an air cylinder to cause the second projection to collide against the first projection) and allows any first projection to collide against the second projection.

The machine tool may be controlled by a numerical controller, and the numerical controller may have an adjustment section which calculates a magnitude of dynamic balance of the rotating tool from a magnitude of position deviation of the translation axis or the rotational axis, calculates a direction in which the dynamic balance deviates, from the rotation angle of the spindle and a phase difference in the position deviation, and automatically controls the respective axes to adjust a position of the tool holder so as to minimize the magnitude of the dynamic balance.

In the embodiment, the numerical controller mounted in the machine tool constantly monitors the position deviation in order to control the positions of the respective axes, and internally has a parameter for the position deviation. When the tool holder with the tool has an inappropriate dynamic balance, vibration is transmitted to the machine tool, thus increasing the position deviation. A comparison between the phase of the position deviation and the rotation angle of the spindle allows calculation of the amount and direction of deviation of the dynamic balance. The dynamic balance can be minimized by making a repeated attempt to bring the second projection into contact with a first projection with a phase closest to the direction of the deviation based on the results of the calculation.

The machine tool may be controlled by the numerical controller, and includes a sensor that measures an amount and a phase of rotation runout of the rotating tool. The numerical controller may include an adjustment section which calculates a direction in which the dynamic balance deviates, from the rotation angle of the spindle and the phase of the rotation runout, and automatically controls the respective axes to adjust a position of the tool holder so as to minimize an amount of the rotation runout.

The embodiment needs a sensor because the runout of the tool is unknown unless the tool itself is measured. A comparison between the amount of runout of the tool and the rotation angle of the spindle allows calculation of the amount and direction of deviation of the dynamic balance. The runout of the tool can be minimized by making a repeated attempt to bring the second projection into contact with a first projection with a phase closest to the direction of the deviation based on the results of the calculation. The position of the tool holder where the runout of the tool is minimized does not necessarily coincide with the position of the tool holder where the dynamic balance is minimized.

The chuck may be a vacuum chuck. The adjustment mechanism may further have a degree-of-vacuum change unit that enables a degree of vacuum of the vacuum chuck to be optionally changed, and reduce the degree of vacuum when the rotation runout or dynamic balance of the rotating tool is adjusted. Thus, displacement of the position of the tool holder is facilitated by reducing the degree of vacuum during adjustment.

The chuck may be a magnetic chuck that generates a magnetic force using a permanent magnet. The adjustment mechanism may further include a mechanism that feeds an air pressure to an attachment surface of the tool holder and a mechanism that enables the air pressure to be optionally changed, and increases the air pressure when the rotation runout or dynamic balance of the rotating tool is adjusted.

In the embodiment, the magnetic chuck may be of an electromagnetic type, but is more desirably a permanent magnet which eliminates the need for power supply and which enables attraction even at the time of power outage. However, the permanent magnet fails to allow an attraction force to be adjusted. Displacement of the position of the tool holder is facilitated by applying a force acting against the attraction force of the permanent magnet using air pressure. Furthermore, when the tool holder is replaced, removal of the tool holder is facilitated by using the air pressure.

The numerical controller may connect to a collision detection unit that detects a collision between the first projection and the second projection based on the position deviation.

The present invention can provide an adjustment mechanism for rotation runout and dynamic balance of a rotating tool which displaces the positions of the rotating tool and the tool holder with the spindle shaft kept rotating to enable adjustment of the rotation runout and dynamic balance of the rotating tool.

BRIEF DESCRIPTION OF THE DRAWINGS

The above-described and other objects and features of the present invention will be apparent from the description of embodiments with reference to the attached drawings, wherein:

FIG. 4B is configured to be able to rotate;

DETAILED DESCRIPTION OF THE PREFERRED EMBODIMENTS

Figure 1A:
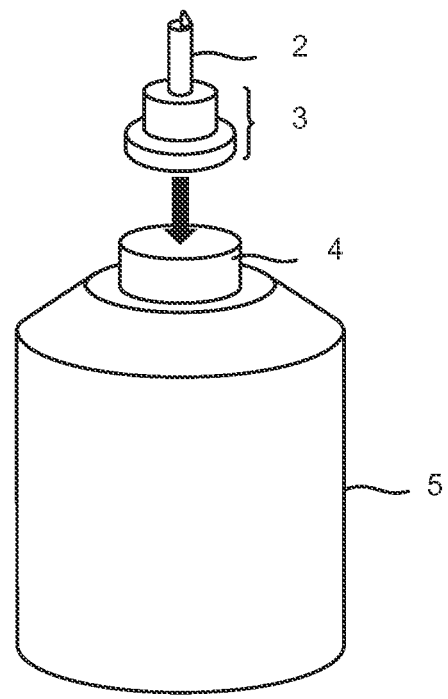
FIG. 1A is a diagram depicting a rotating tool, a tool holder, a spindle, and a shaft.

Embodiments of the present invention will be described below along with the drawings. Components of the embodiments which are identical or similar to corresponding components of the above-described conventional technique are denoted by the same reference numerals.

FIG. 1A depicts a rotating tool 2, a tool holder 3, a spindle shaft 4, and a spindle 5. The tool holder 3 is sucked by and fixed to the spindle shaft 4 using a vacuum chuck (FIG. 2A) or a magnetic chuck (FIG. 2B).

Figure 1B:
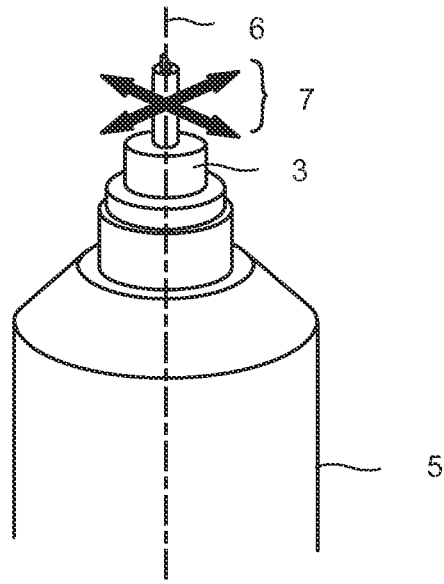
FIG. 1B is a diagram illustrating that the chuck depicted in FIG. 1A can be slid using a chuck section of the chuck, and thus, the attachment position of the tool holder can be displaced in two directions orthogonal to the rotational axis of the spindle shaft.

As depicted in FIG. 1B, the vacuum chuck (or the magnetic chuck) can be slid using a chuck section of the chuck. Thus, an attachment position of the tool holder 3 can be displaced in two directions 7 orthogonal to the rotational axis 6 of the spindle shaft 4.

In the sole spindle 5, even when the spindle shaft 4 has a proper dynamic balance, chucking the tool holder 3 may cause deviation of the dynamic balance. The deviation of the dynamic balance can be corrected by adjusting the position of the tool holder 3 relative to the rotational axis 6 of the spindle shaft 4 in the two directions 7 orthogonal to the rotational axis. Furthermore, attachment of the rotating tool 2 concentric with the rotational axis 6 may be considered to be more important than the dynamic balance depending on the type of machining. Also in this case, displacement of the spindle shaft 4 from the center of rotation may be compensated by making adjustment in the two directions 7 orthogonal to the rotational axis.

Figure 2A:
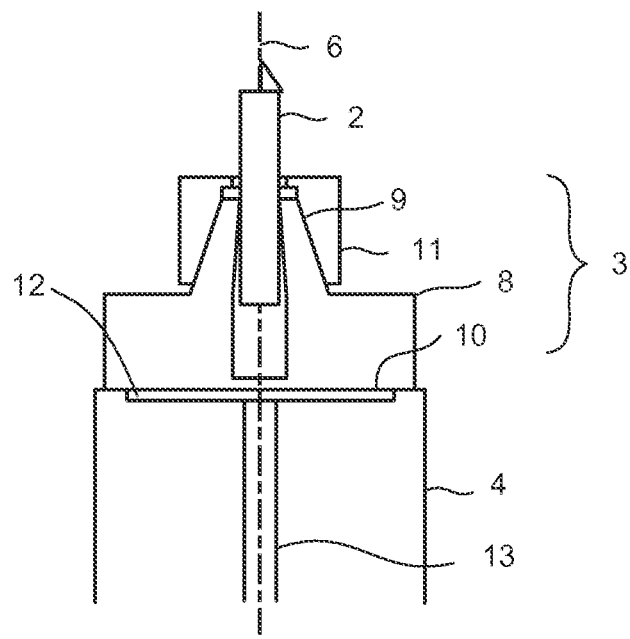
FIG. 2A is a schematic diagram of a cross section of a vacuum chuck.
Figure 2B:
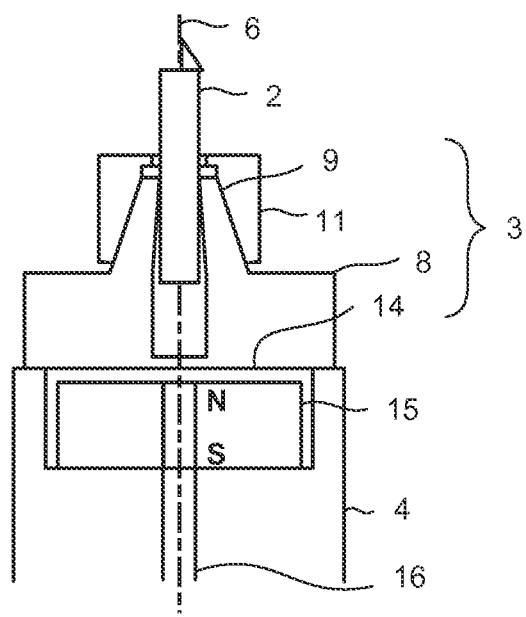
FIG. 2B is a schematic diagram of a cross section of a magnetic chuck.

FIG. 2A is a schematic diagram of a cross section of the vacuum chuck.

The tool holder 3 includes a tool holder main body 8 and a tapered flange 11. The tool holder main body 8 is externally shaped like a pyramid and includes a collet 9 integrated with the tool holder main body 8 to grip the rotating tool 2. The tapered flange 11 is pushed into the collet 9 of the tool holder main body 8 in a direction of the rotational axis 6 using bolts (not depicted in the drawings) or the like, to deform the collet 9 inward in a radial direction, thus fixing the rotating tool 2 to the tool holder main body 8.

A collet chuck configured as the tool holder 3 is a structure that allows the rotating tool 2 to be fixed and has no function to make adjustment for the displacement of the rotating tool 2 in the direction perpendicular to the rotational axis 6. Thus, the present invention further includes the vacuum chuck to enable the displacement of the rotating tool 2 to be compensated.

The spindle shaft 4 has a recess space 12 in an upper surface of the spindle shaft 4 and a vacuum conduit 13 in a central portion of the spindle shaft 4 which has an opening in the recess space 12 and which extends in the direction of a center axis. An end of the vacuum conduit 13 opposite to the opening is connected to a vacuum pump (not depicted in the drawings).

When the recess space 12 formed in the upper surface of the spindle shaft 4 is vacuumed, a suction force is exerted on a vacuum chuck surface 10 on the side of a tool holder 3 to fix the tool holder 3 to the spindle shaft 4. To prevent leakage of vacuum, the vacuum chuck surface 10 needs to have a flatness and a surface roughness which are accurate to some degree. The recess in the vacuum chuck surface 10 may be formed on the side of the tool holder 3.

FIG. 2B is a schematic diagram of a cross section of the magnetic chuck.

The tool holder 3 includes the tool holder main body 8 and the tapered flange 11. The tool holder main body 8 is externally shaped like a pyramid and includes the collet 9 integrated with the tool holder main body 8 to grip the rotating tool 2. The tapered flange 11 is pushed into the collet 9 of the tool holder main body 8 in a direction of the rotational axis 6 using bolts (not depicted in the drawings) or the like, to deform the collet 9 inward in a radial direction, thus fixing the rotating tool 2 to the tool holder main body 8.

A collet chuck configured as the tool holder 3 is a structure that allows the rotating tool 2 to be fixed and has no function to make adjustment for the displacement of the rotating tool 2 in the direction perpendicular to the rotational axis 6. Thus, the present invention further includes the magnetic chuck to enable the displacement of the rotating tool 2 to be compensated.

A ring magnet 15 is mounted in an upper portion of the spindle shaft 4 to allow a magnetic attraction force to be exerted on a magnetic chuck surface 14 on the side of the tool holder 3 to fix the tool holder 3, which is a magnetic substance (for example, magnetic stainless steel), to the spindle shaft 4.

Adjustment of the magnitude of a magnetic force is impossible, preventing the tool holder 3 from being easily removed. Thus, an air conduit 16 formed in the spindle shaft 4 is connected to a pressure source (not depicted in the drawings) to apply an air pressure to the magnetic chuck surface 14 via the air conduit 16 to offset the attraction force of the magnetic force, thus facilitating removal of the tool holder 3. With the same area, the attraction force of a magnetic force can generally be made stronger than the suction force of vacuum, preventing the attraction force from being lost even when power outage occurs. Thus, the magnetic chuck is safe. The ring magnet 15 providing the magnetic chuck may be mounted on the side of the tool holder 3.

First, a first embodiment of the adjustment mechanism for rotation runout and dynamic balance of the rotating tool according to the present invention will be described using FIG. 3.

The tool holder 3 includes a first projection 19 on an outer peripheral surface thereof at a predetermined position. A fixing member 20 includes a second projection 21. The second projection 21 is disposed on a plane formed by the trajectory of the first projection 19 when the spindle shaft 4 is rotated. The spindle 5 is attached to a slide 17 that moves up and down to enable a change in a relative distance La between the first projection 19 and the second projection 21. Moving the slide 17 in a slide moving direction depicted in FIG. 3 enables the first projection 19 to collide against the second projection 21. The height by which the first projection 19 projects from a peripheral surface of the tool holder 3 is set larger than the amount of decentering of the tool holder 3 from the rotational axis 6 (the normally possible maximum value of the amount of decentering).

When the first projection 19 and the second projection 21 collide against each other with the spindle shaft 4 of the spindle 5 kept rotating, an external force is applied to the first projection 19 to allow the position of the tool holder 3 to be displaced. When a collision direction coincides with a gravity direction 22 as depicted in FIG. 3, the weight of the tool holder 3 also acts to allow the position of the tool holder 3 to be displaced by a weaker force. Furthermore, the rotation of the first projection 19 causes intermittent collisions in synchronism with the rotation. For example, when the rotation speed is 6,000 rpm, 100 collisions occur per second. In general, an object can be moved a very short distance more easily by hitting the object than by applying a static force to the object. Thus, the method of causing the spindle shaft 4 to collide while rotating the spindle shaft 4 is suitable for moving the object a very short distance.

Application of a strong force broadly moves the tool holder 3 to cause a significant deviation of the dynamic balance, resulting in a dangerous mode. In the case of the embodiment of the present invention, a hitting operation is allowed to be performed a large number of times in a short time using weak force. This prevents significant deviation of the dynamic balance and is safe. Furthermore, for example, when, at the position where the first projection 19 and the second projection 21 come into contact with each other, the first projection 19 or the second projection 21 is moved 1 μm closer to the second projection 21 or the first projection 19 with respect to the relative distance La, the first projection 19 and the second projection 21 are out of contact with each other when a displacement equal to or more than 1 μm occurs. Thus, the amount of displacement can be adjusted based on the movement of the slide 17.

Figure 3:
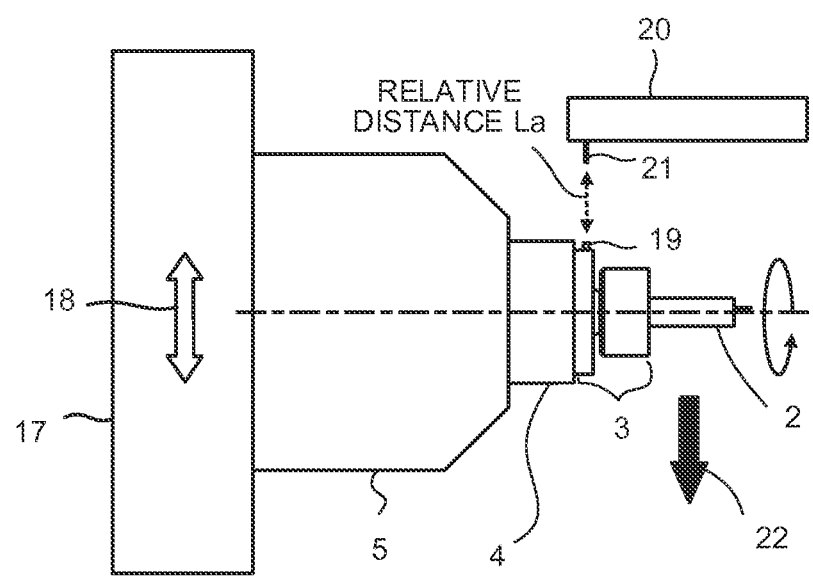
FIG. 3 is a diagram illustrating a first embodiment of an adjustment mechanism for rotation runout and dynamic balance of a rotating tool according to the present invention.
Figure 4A:
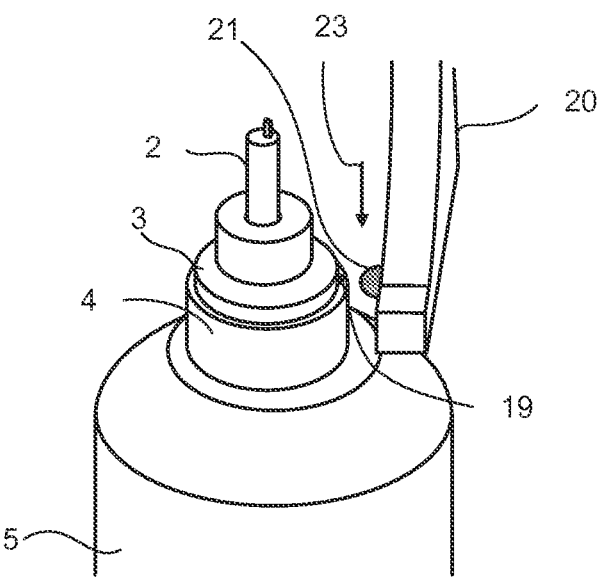
FIG. 4A is a diagram depicting a specific shapes of a first projection and a second projection depicted in FIG. 3.
Figure 4B:
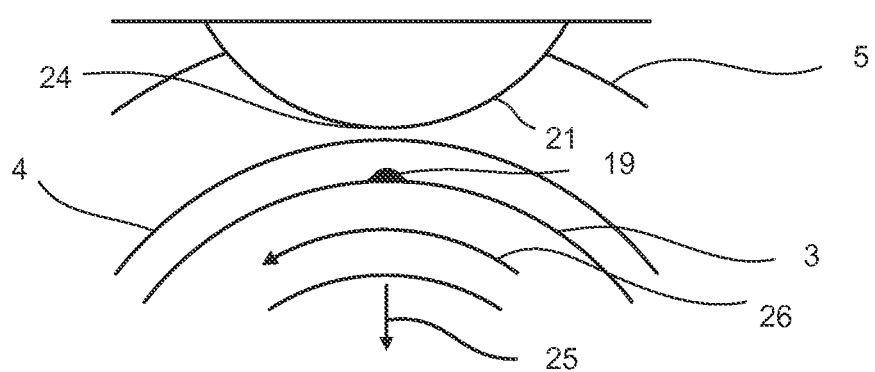
FIG. 4B is a diagram corresponding to FIG. 4A as viewed in the direction of arrow 23.

FIG. 4A and FIG. 4B are diagrams depicting the specific shapes of the first projection 19 and second projection 21 depicted in FIG. 3.

FIG. 4B is a diagram corresponding to FIG. 4A as viewed in the direction of arrow 23. The first projection 19 and the second projection 21 are both circular-arc-shaped thin plates. The first projection 19 collides against an apex portion 24 of the second projection. A force resulting from the collision desirably moves the tool holder 3 in a direction 25 toward the center of rotation. However, since the first projection 19 is in rotation, a force acting toward the center of rotation does not necessarily occur in the tool holder 3. If such a force fails to occur in the tool holder 3, the collision position may be displaced from the apex portion 24 of the second projection to fine-tune the direction of a force resulting from the collision. The second projection 21 is desirably formed of a material, such as cemented carbide, which is unlikely to be worn.

Figure 5:
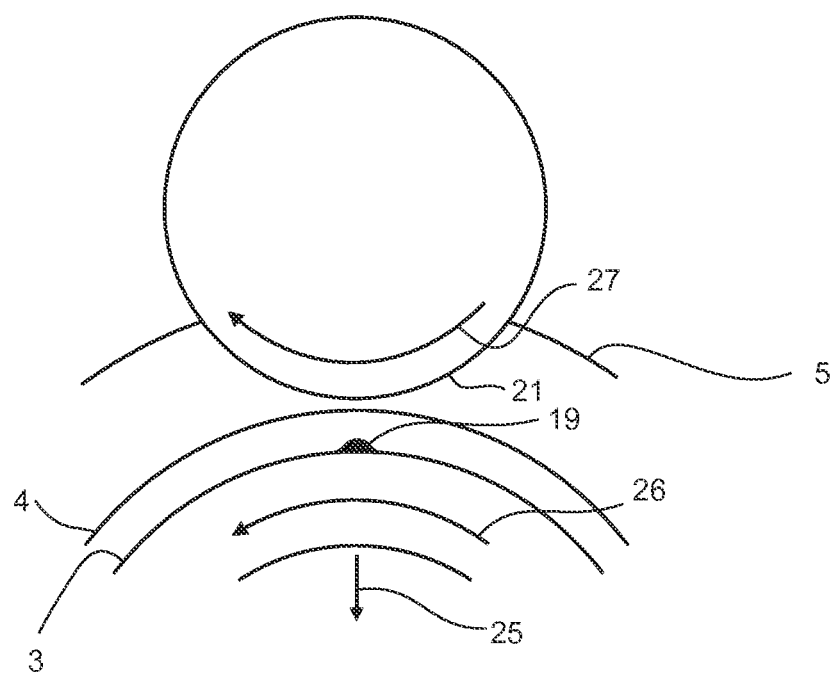
FIG. 5 is a diagram illustrating a variation of the first embodiment in which a second projection depicted in FIG. 4A

FIG. 5 is a diagram depicting a variation of the first embodiment in which the second projection 21 depicted in FIG. 4A and FIG. 4B is configured to be able to rotate.

The second projection 21 is connected to a rotating apparatus (not depicted in the drawings) to rotate in a direction (the rotation direction 27 of the second projection) opposite to the rotation direction 26 (the rotation direction of the spindle 5) of the first projection 19. The peripheral speed of outer periphery of the second projection 21 is set equal to the peripheral speed of the first projection 19. In this state, a collision between the first projection 19 and the second projection 21 zeros the relative rotation speed between of the projections 19 and 21. This in principle allows the direction in which the collision force is exerted on the first projection 19 to be aligned with the direction 25 toward the center of rotation.

Now, a second embodiment of the adjustment mechanism for rotation runout and dynamic balance of the rotating tool will be described using FIG. 6A and FIG. 6B.

Figure 6A:
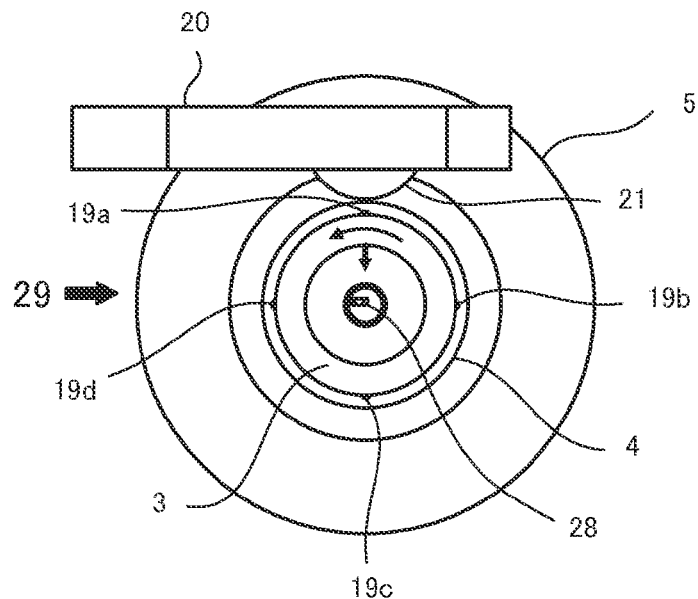
FIG. 6A is a diagram depicting a second embodiment of the adjustment mechanism for rotation runout and dynamic balance of the rotating tool according to the present invention.

As depicted in FIG. 6A, four first projections (19a, 19b, 19c and 19d) are disposed on the outer peripheral surface of the tool holder 3 so as to have phases different from one another by 90° with respect to the center of rotation 28. The four first projections 19a, 19b, 19c and 19d are disposed at different positions in the direction 30 of the rotational axis as depicted in FIG. 6B corresponding to FIG. 6A as viewed in the direction of arrow 29. Thus, planes formed by the trajectory of the first projection 19a, 19b, 19c and 19d during rotation avoid overlapping one another. When the spindle 5 is moved in an "approaching direction 31" depicted in FIG. 6B with the spindle shaft 4 of the spindle 5 kept rotating, only one of the first projections 19a, 19b, 19c and 19d, that is, the projection 19a, collides against the second projection 21, whereas the remaining projections 19b, 19c and 19d are precluded from colliding against the second projection 21 because the projections 19b, 19c, and 19d are disposed at the positions that do not coincide with the second projection 21.

When the position of the spindle 5 is displaced in the direction 30 of the rotational axis, one of the first projections 19a, 19b, 19c and 19d collides against the second projection 21. Since the first projections 19a, 19b, 19c and 19d have phases different from one another by 90° as described above, the position of the tool holder 3 can be moved in one of four directions perpendicular to the rotational axis 6 depending on which of the first projections 19a, 19b, 19c and 19d is caused to collide against the second projection 21. This allows optional correction of the position of the tool holder 3 in a direction perpendicular to the rotational axis 6.

Now, a third embodiment of the adjustment mechanism for rotation runout and dynamic balance of the rotating tool according to the present invention will be described using FIG. 7.

A machine tool M as a whole is controlled by a numerical controller 40. The machine tool M includes, on a machine base 41, an X axis base 42 that supports an X axis slide 43 so that the X axis slide 43 is movable and a Y axis base 44 that supports a Y axis slide 45 so that the Y axis slide 45 is movable. A workpiece 33 is placed on the X axis slide 43. A Z axis base 46 is fixed to the Y axis slide 45; the Z axis base 46 supports a Z axis slide 47 so that the Z axis slide 47 is movable. The spindle 5 chucking the tool holder 3 is attached to the Z axis slide 47. The second projection 21 is provided on a fixing member 20 (see FIG. 6A) attached to the machine base 41. Reference numeral 50 denotes a power and signal line.

Figure 6B:
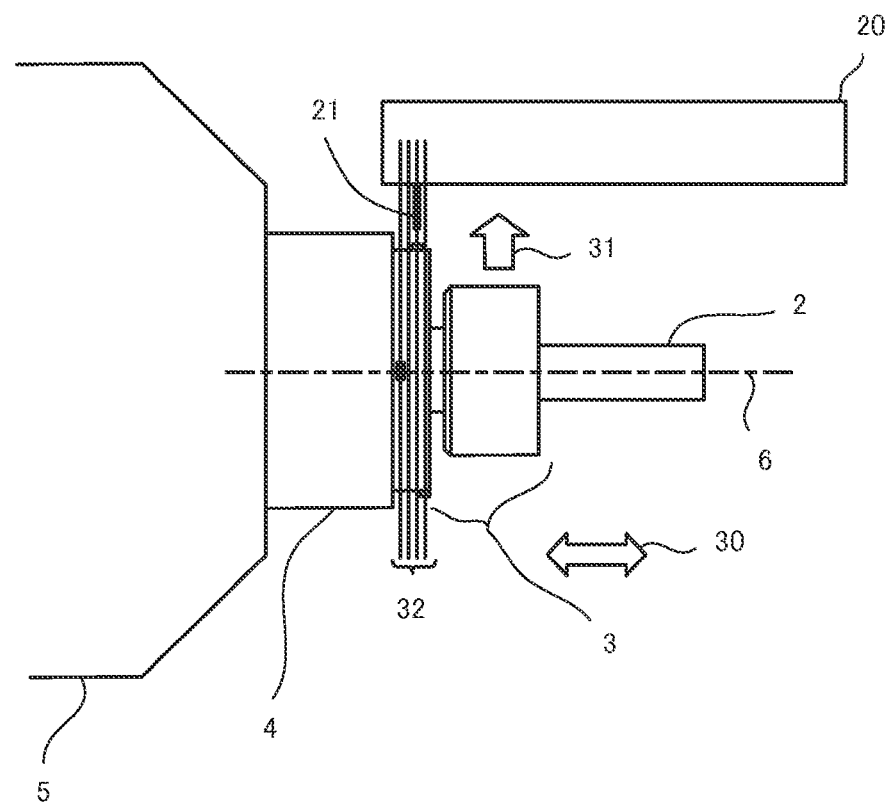
FIG. 6B is a diagram corresponding to FIG. 6A as viewed in the direction of arrow 29.

The dispositions of the first projection 19 and the second projection 21 are similar to the dispositions depicted in FIG. 6A and FIG. 6B. The numerical controller 40 controls operations of adjusting, based on the X axis, the position where the first projection 19 comes into contact with the second projection 21, setting, based on the Z axis, the first projection 19 to collide against at the same height as that of the second projection 21, and reducing, based on the Y axis, the distance between the first projection 19 and the second projection 21 to cause the first projection 19 and the second projection 21 to collide against each other. If the dynamic balance deviates when the spindle shaft 4 of the spindle 5 rotates, vibration 48 of the spindle shaft in a Y axis direction is transmitted to the Y axis (Y axis slide 45). The vibration 48 is detected by the numerical controller 40 as a position deviation of the Y axis (the difference between a specified position and an actual position).

Now, a fourth embodiment of the adjustment mechanism for rotation runout and dynamic balance of the rotating tool according to the present invention will be described using FIG. 8 and FIG. 9.

Figure 8:
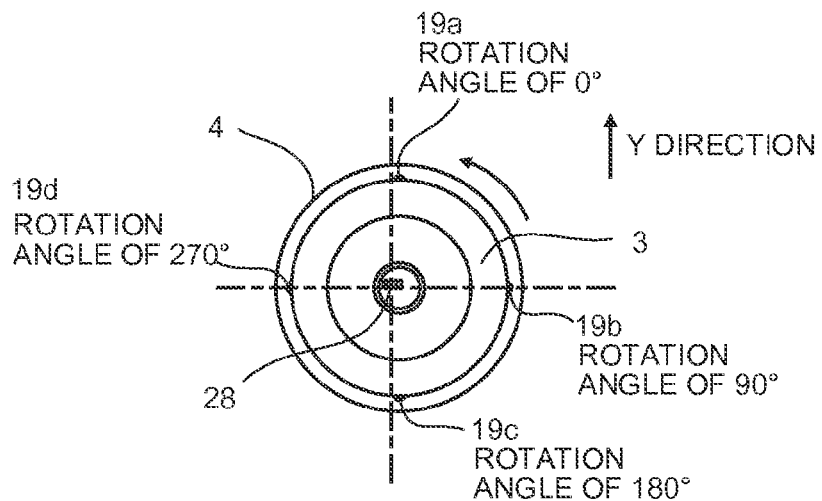
FIG. 8 is a diagram depicting a fourth embodiment of the adjustment mechanism for rotation runout and dynamic balance of the rotating tool according to the present invention.

FIG. 8 is a diagram of the tool holder 3 as viewed from the rotational axis 6 side thereof. The tool holder 3 is chucked so as to be decentered toward the first projection 19b and so that the first projection 19a is set in a Y direction 49 when the spindle shaft 4 has a rotation angle of 0°. In this case, the decentering causes the dynamic balance to deviate, and thus, rotation of the spindle shaft 4 causes vibration.

Figure 9:
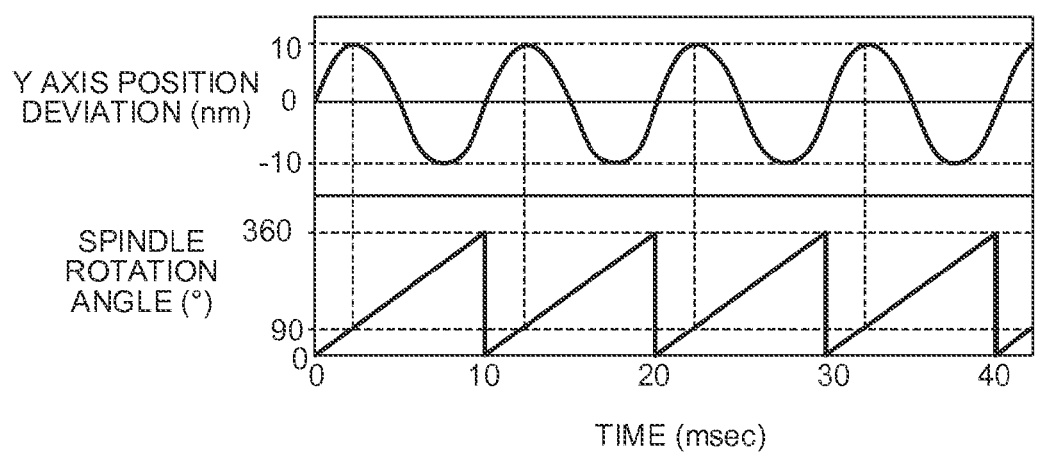
FIG. 9 is a graph resulting from simultaneous plotting of a position deviation of a Y axis and the rotation angle of the spindle shaft which are obtained when the spindle is rotated at 6,000 rpm in a decentering state depicted in FIG. 8.

FIG. 9 is a graph resulting from simultaneous plotting of the position deviation of the Y axis and the rotation angle of the spindle shaft which are detected by the numerical controller when the spindle is rotated at 6,000 rpm in the decentering state depicted in FIG. 8. Rotation of the spindle at 6,000 rpm has the same meaning as that of rotation of the spindle shaft 4 at 6,000 rpm. The spindle shaft 4 makes 100 rotations per second and thus repeats 360° rotations at intervals of 10 milliseconds. The vibration caused by the decentering is transmitted to the Y axis and detected as a position deviation. The direction of the decentering is toward the first projection 19b as depicted in FIG. 8, and thus, the first projection 19b is positioned in the Y direction when the rotation angle is 90°. At this time, the position deviation in the graph has the positive maximum value.

As long as the phase (the correspondence between the first projections 19a, 19b, 19c and 19d and the rotation angle) of the tool holder 3 chucked by the spindle 5 (spindle shaft 4) is known, it is possible to specify a rotation angle at which the position deviation of the Y axis is maximized, based on the graph in FIG. 9. Thus, the numerical controller 40 can detect the direction of deviation of the dynamic balance. Furthermore, pre-examination of the relation between the amount of deviation of the dynamic balance and the position deviation allows the amount of deviation of the dynamic balance to be calculated based on the maximum value of the position deviation. To be exact, as it requires a certain time to detect vibration of the spindle 5 and to process signals in the numerical controller 40, the calculations may be executed taking these time differences into account.

As described above, the fourth embodiment enables the direction and amount of deviation of the dynamic balance to be determined to allow determination of which of the four first projections 19a, 19b, 19c and 19d is to be caused to collide against the second projection 21, using only the numerical controller 40, with no need to add a separate sensor. Thus, the numerical controller 40 performs automatic control to enable the axes to be moved as described with reference to FIG. 7 (third embodiment), correcting the dynamic balance.

Now, a fifth embodiment of the adjustment mechanism for rotation runout and dynamic balance of the rotating tool according to the present invention will be described using FIG. 10 and FIG. 11.

Figure 7:
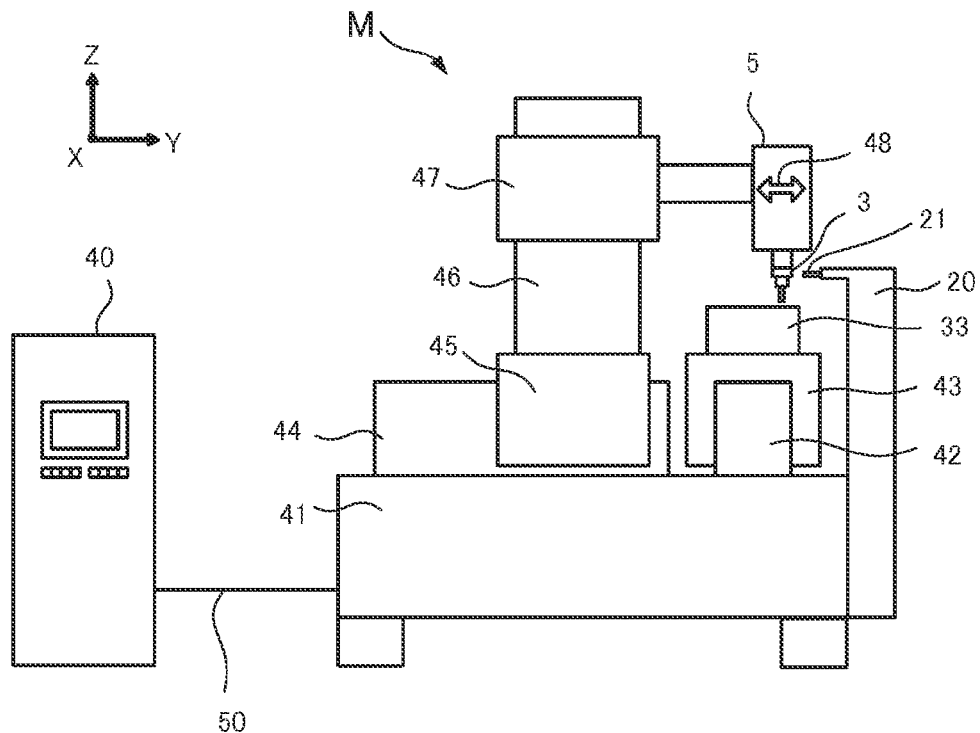
FIG. 7 is a diagram depicting a third embodiment of the adjustment mechanism for rotation runout and dynamic balance of the rotating tool according to the present invention.

The fifth embodiment has substantially the same structure as that of the third embodiment depicted in FIG. 7. However, a noncontact displacement gauge 51 is additionally fixed to the fixing member 20. To allow the amount of runout of the rotating tool 2 to be detected, the X axis, the Y axis and the Z axis are moved to move the outer peripheral surface of a tool shank (tool holder 3) to a measurement range of the noncontact displacement gauge 51. A detection signal from the noncontact displacement gauge 51 is loaded into the numerical controller 40.

In general, significant runout of the rotating tool 2 disrupts the dynamic balance. Deviation of the dynamic balance corresponds to vibration and is thus inevitably detected as the position deviation of the Y axis. However, even with the runout of the rotating tool 2, the runout is not detected as vibration as long as the proper dynamic balance is present. Thus, the runout of the tool is not reliably detected based on the position deviation, and thus, a displacement sensor is needed. A contact displacement sensor has difficulty measuring the tool shank (tool holder 3) rotating at high speed. Accordingly, the noncontact displacement gauge 51 is desirably used.

Figure 10:
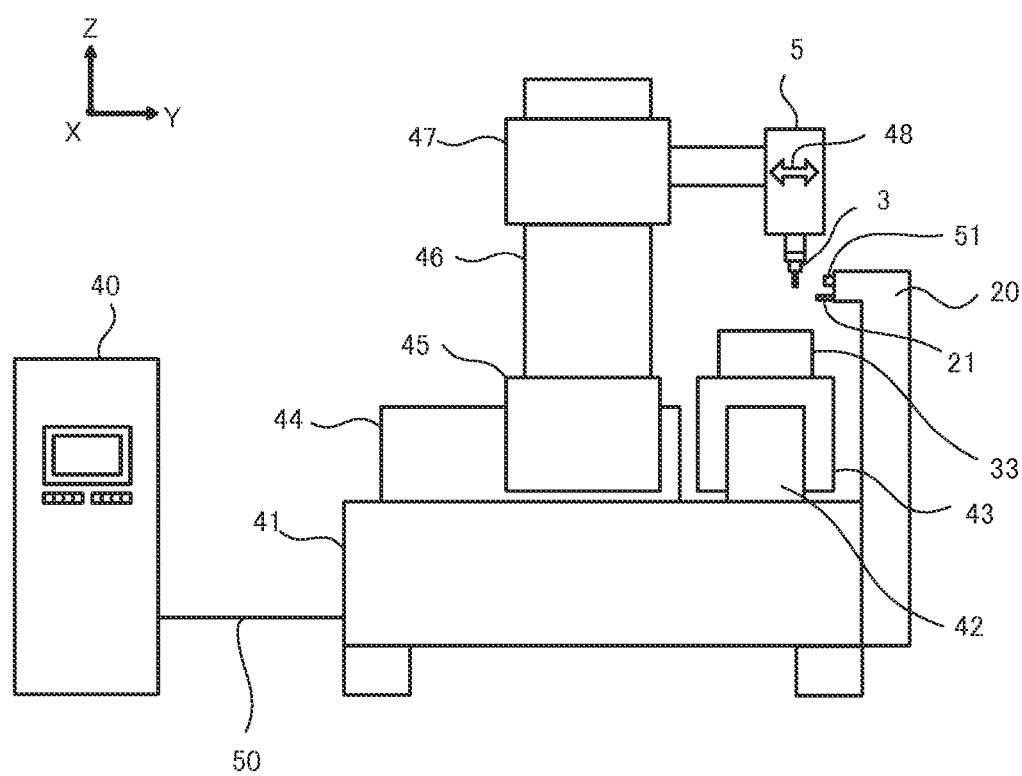
FIG. 10 is a diagram depicting a fifth embodiment of the adjustment mechanism for rotation runout and dynamic balance of the rotating tool according to the present invention.
Figure 11:
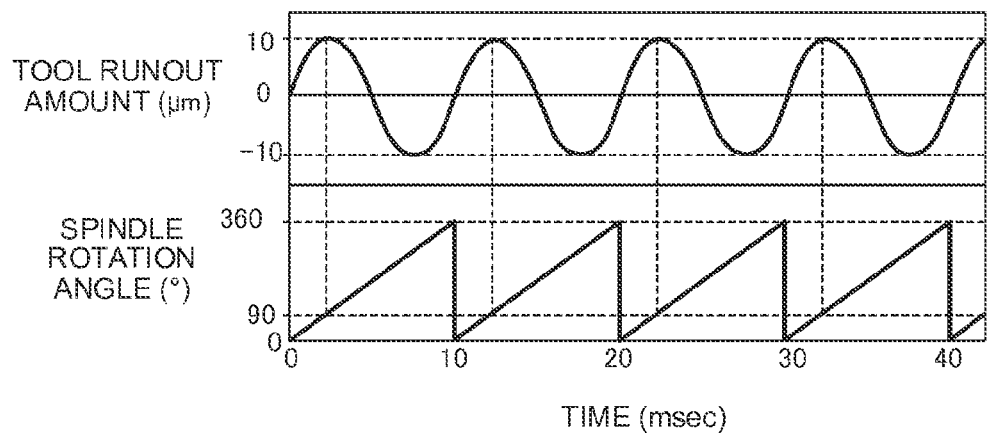
FIG. 11 is a graph resulting from simultaneous plotting of an output (tool runout amount) from a noncontact displacement gauge and the rotation angle of the spindle (the rotation angle of the spindle shaft) in FIG. 10.

FIG. 11 is a graph resulting from simultaneous plotting of an output (tool runout amount) from the noncontact displacement gauge 51 in FIG. 10 and the rotation angle of the spindle 5 (the rotation angle of the spindle shaft 4) in FIG. 10 which are obtained when the tool is decentered in a positional relation similar to the positional relation in FIG. 8 (the amount of decentering is approximately 10 μm).

The tool runout amount indicated in FIG. 11 basically corresponds to a signal similar to a signal of the position deviation indicated in the graph in FIG. 9. The direction and amount of decentering of the tool can be calculated using a calculation method similar to the calculation method in the case of FIG. 9. The numerical controller 40 then performs automatic control to enable the axes to be moved as described with reference to FIG. 7, compensating the runout of the tool. Also in this case, a time difference may be present between the output from the displacement sensor and the detection of the rotation angle of the spindle and may thus be taken into account during the calculations.

Now, a sixth embodiment of the adjustment mechanism for rotation runout and dynamic balance of the rotating tool according to the present invention will be described using FIG. 12.

The vacuum chuck surface 10 is connected to the vacuum conduit in the spindle shaft 4 to receive, at a trailing end 57 of the spindle shaft, a vacuum pressure from a noncontact joint 56 via a gap 58 of several μm in a noncontact manner. A vacuum source is a vacuum pump 53 connected to the noncontact joint 56 through a vacuum tube 55 via an electronic vacuum regulator 54a that can optionally control the degree of vacuum using the numerical controller 40. Instructions from the numerical controller 40 are transmitted to the electronic vacuum regulator 54a via a signal line 52.

When the dynamic balance or the runout of the tool is adjusted, the tool holder 3 needs to be moved a very short distance for adjustment according to the method as described-above. A high degree of vacuum causes the vacuum chuck to exert a high suction force, hindering the tool holder 3 from being easily moved a very short distance. Thus, adjustment can be facilitated by using the electronic vacuum regulator 54a to reduce the degree of vacuum only during the adjustment.

When the tool holder 3 is attached or detached, the attachment or detachment of the tool holder 3 can be facilitated by using the electronic vacuum regulator 54a to reduce the degree of vacuum. The tool holder as a whole may be replaced with another tool by mounting a separate mechanism for automatic tool replacement (not depicted in the drawings) in the machine tool as shown in FIG. 7 or FIG. 10.

Figure 13:
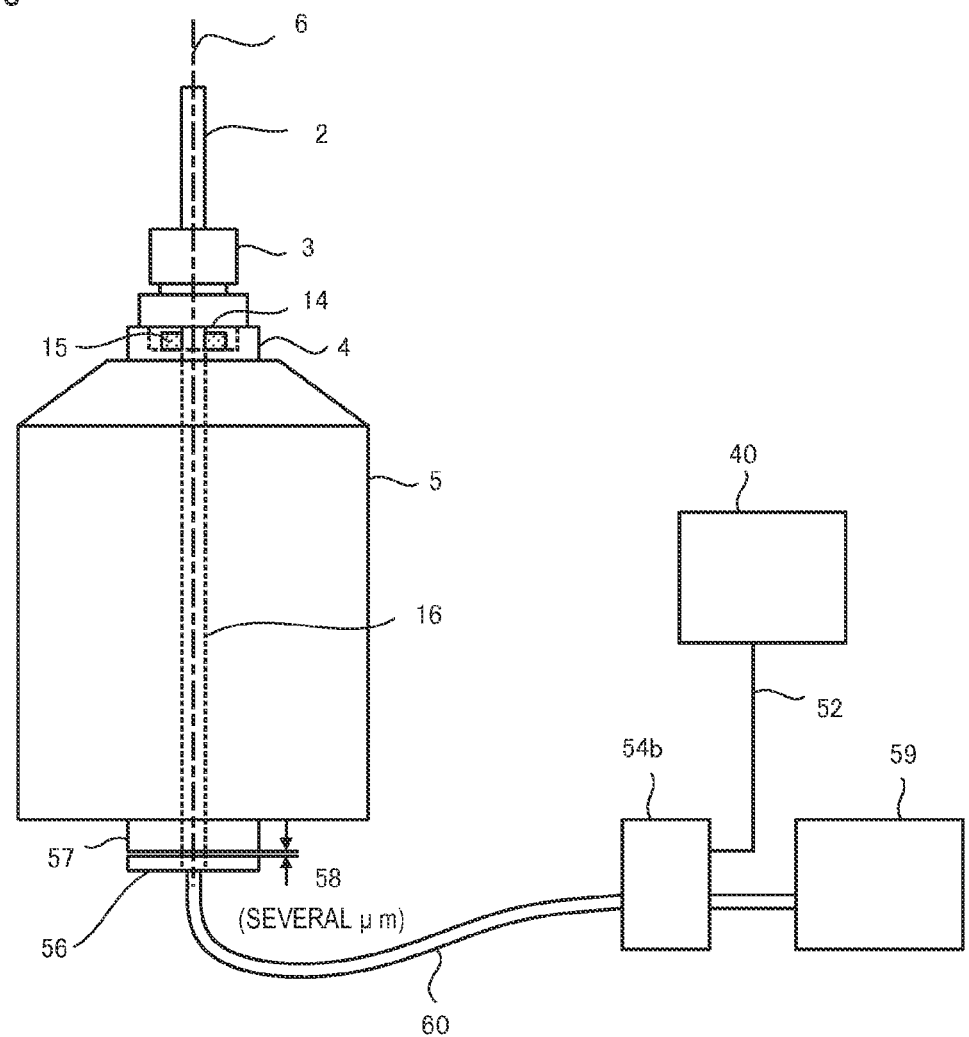
FIG. 13 is a diagram depicting a seventh embodiment of the adjustment mechanism for rotation runout and dynamic balance of the rotating tool according to the present invention.

Now, a seventh embodiment of the adjustment mechanism for rotation runout and dynamic balance of the rotating tool according to the present invention will be described using FIG. 13.

The magnetic chuck using the ring magnet 15 (permanent magnet) is connected to the air conduit 16 in the spindle shaft 4 to receive, at the trailing end 57 of the spindle shaft, an air pressure from the noncontact joint 56 via a gap of several μm in a noncontact manner. An air source is a compressor 59 connected to the noncontact joint 56 through an air tube 60 via an electronic vacuum regulator 54b that can optionally control the air pressure using the numerical controller 40. The permanent magnet is the ring magnet 15 with a hole in the center to pass air therethrough. As is the case with the vacuum in FIG. 12, when the dynamic balance or the runout of the tool is adjusted, the tool holder needs to be moved a very short distance for adjustment. The permanent magnet exerts a high attraction force, hindering the tool holder 3 from being easily moved a very short distance. Thus, adjustment can be facilitated by using the electronic regulator 54b to apply an air pressure to the magnetic chuck surface to reduce the attraction force.

Figure 12:
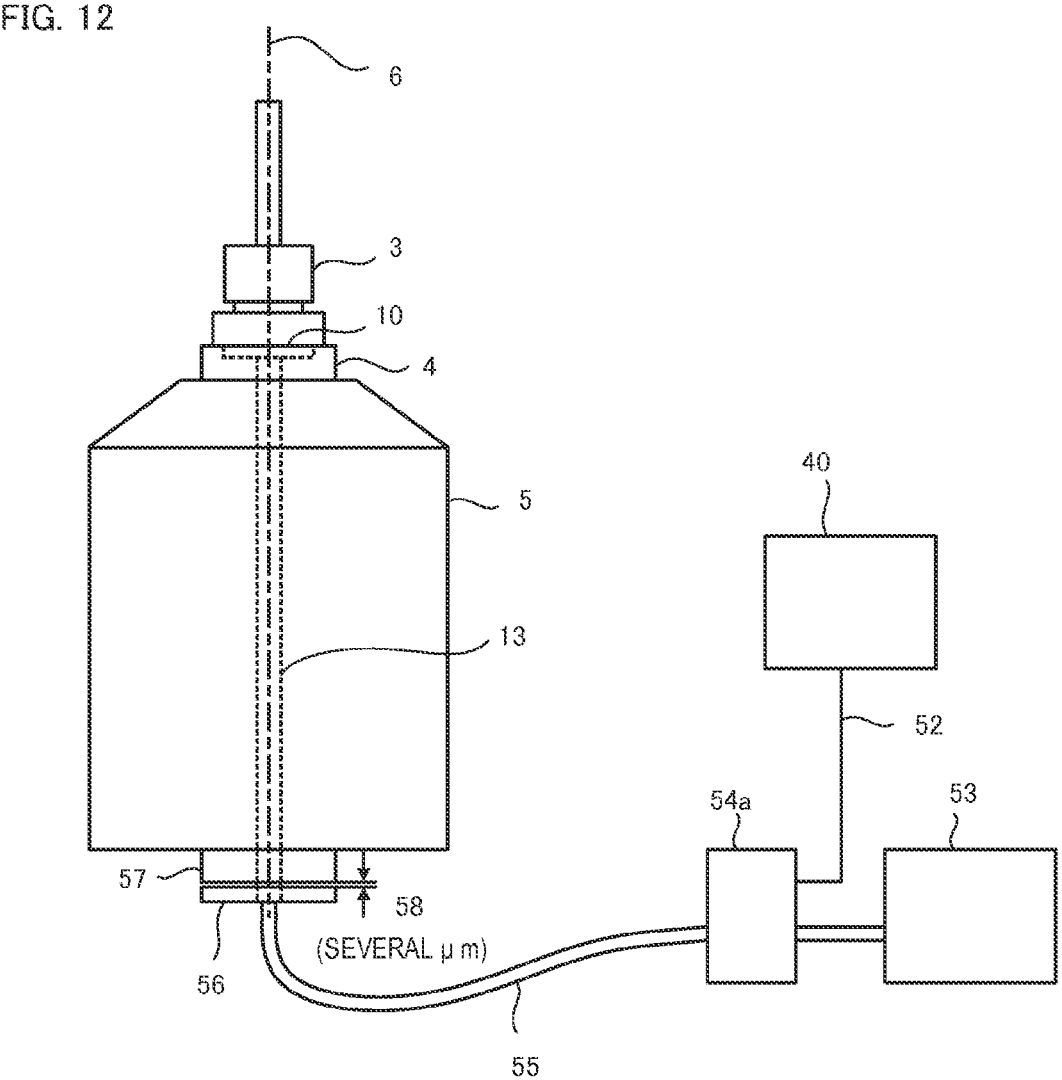
FIG. 12 is a diagram depicting a sixth embodiment of the adjustment mechanism for rotation runout and dynamic balance of the rotating tool according to the present invention.

As is the case with the sixth embodiment depicted in FIG. 12 (the vacuum pressure is reduced by the electronic vacuum regulator 54a), when the tool holder is attached or detached, the attachment or detachment of the tool holder 3 can be facilitated by using the electronic vacuum regulator 54a to apply an air pressure. Similarly, the tool holder as a whole may be replaced with another tool by mounting a separate mechanism for automatic tool replacement (not depicted in the drawings) in the machine tool as shown in FIG. 7 or FIG. 10.

Figure 14:
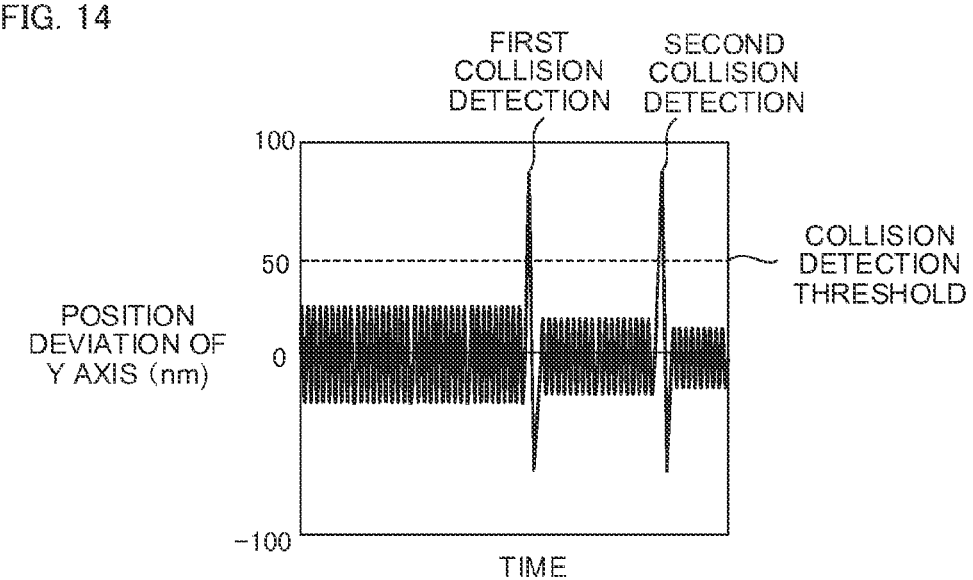
FIG. 14 is a diagram depicting an eighth embodiment of the adjustment mechanism for rotation runout and dynamic balance of the rotating tool according to the present invention.

Now, an eighth embodiment of the adjustment mechanism for rotation runout and dynamic balance of the rotating tool according to the present invention will be described using FIG. 14.

Configurations of an adjustment mechanism and a machine tool to which the adjustment mechanism is attached are the same as the configurations as shown in FIG. 7 (third embodiment). FIG. 14 depicts the position deviation of the Y axis, plotted with respect to time, which is detected by the numerical controller when the spindle is rotated in the decentering state depicted in FIG. 8.

When the first projection and the second projection are caused to collide against each other in the Y axis direction, the resultant impact arises as a position deviation of the Y axis. Thus, a threshold (in FIG. 14, 50 nm) is preset for the position deviation of the Y axis so as to allow an impact to be detected. The spindle is rotated at a rotation speed equal to or less than a value corresponding to the threshold. The Y axis is moved at a low speed and then stopped when the position deviation exceeds the threshold, meaning that a collision has occurred. This allows a collision to be detected using only the functions of the numerical controller of the machine tool, with no need to attach a separate contact sensor or the like to the second projection. Furthermore, the degree of a collision varies in accordance with the speed at which the Y axis is fed. Thus, a single detection of a collision allows adjustment of the amount by which the tool holder is displaced.

In the axis configuration of the machine tool as shown in FIG. 7 (third embodiment), the Z axis is present between the spindle 5 and the Y axis, preventing direct detection of the position deviation of the Y axis. However, the structure according to the eighth embodiment is more desirable because the direction of the spindle 5 and the axis configuration are changed so as to enable the position deviation to be detected on the axis to which the spindle 5 is directly attached, allowing the dynamic balance and a collision to be precisely detected. Furthermore, similar detection can be achieved by utilizing the rotational axis instead of the translation axis.

The detection of a collision utilizing the position deviation is known from the conventional technique (Japanese Patent No. 4276252). According to the present invention, the rotating first projection collides, and thus, intermittent collisions occur instead of a static contact. Thus, a correspondingly high impact results and is more easily detected.

Figure 15:
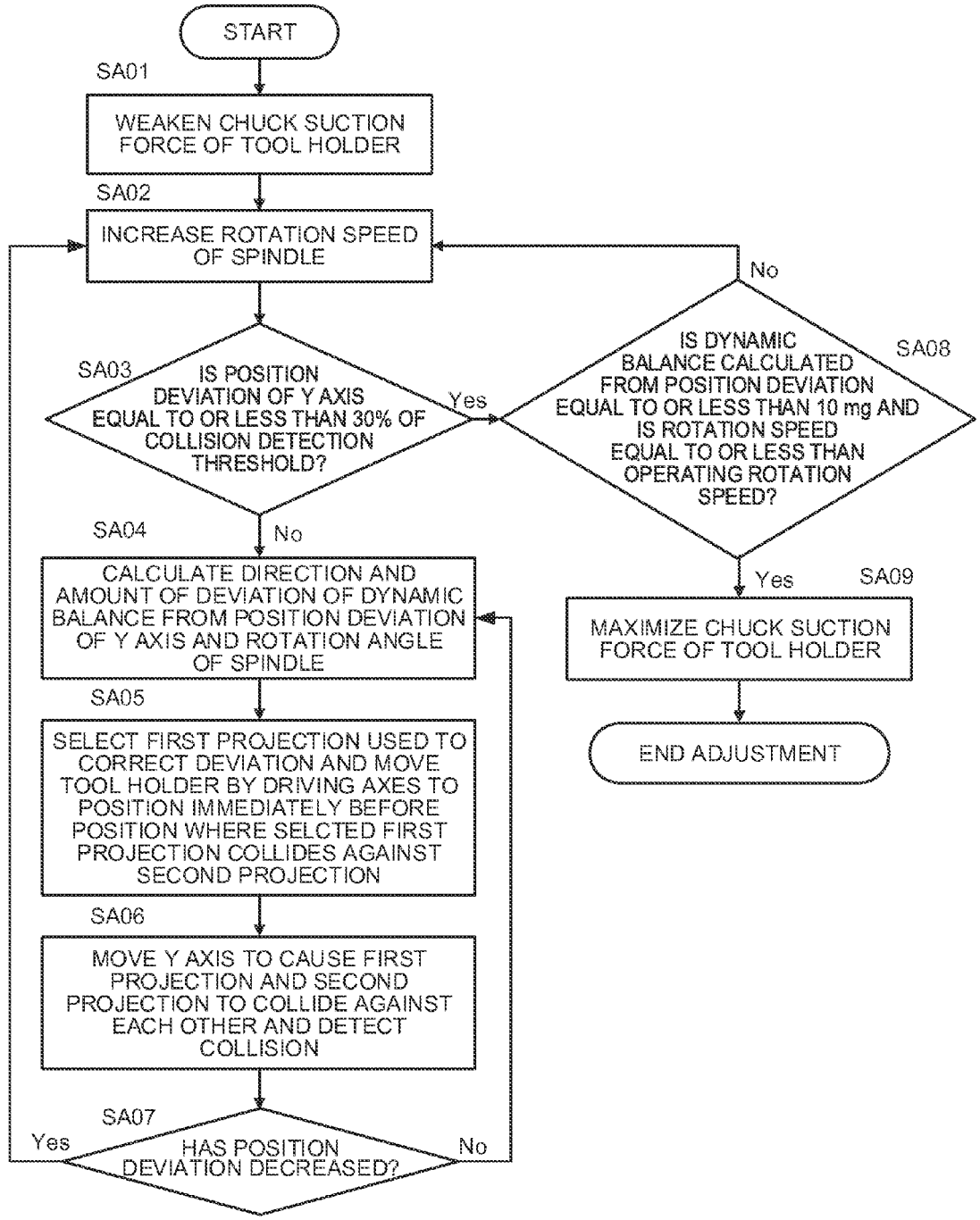
FIG. 15 is a flowchart illustrating a procedure for a process of adjusting dynamic balance of a tool using the adjustment mechanism according to the present invention.
Figure 16A:
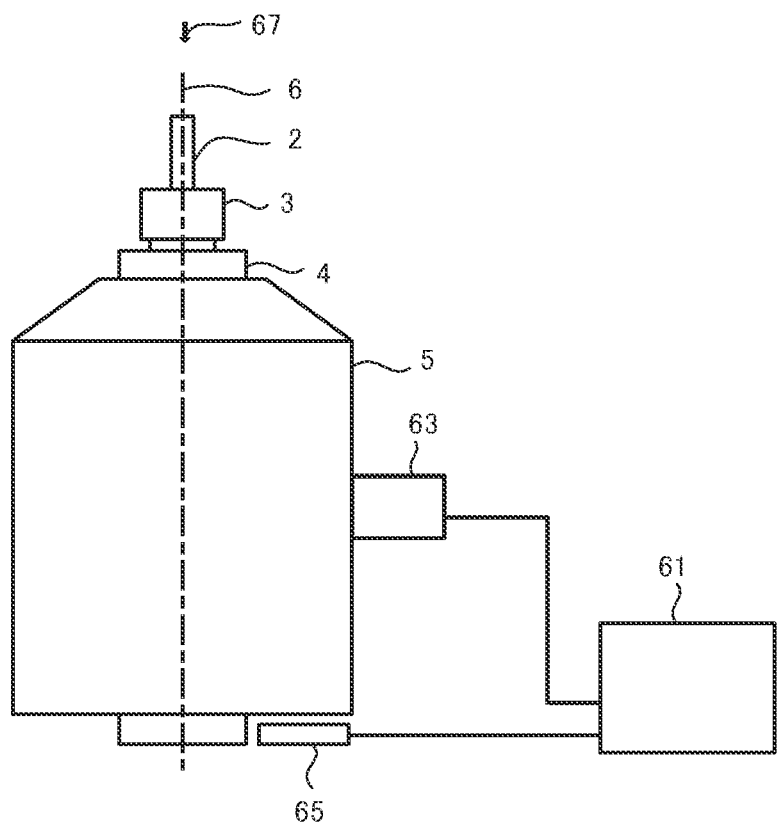
FIG. 16A is a diagram illustrating adjustment of rotation runout and dynamic balance of a rotating tool according to a conventional technique.
Figure 16B:
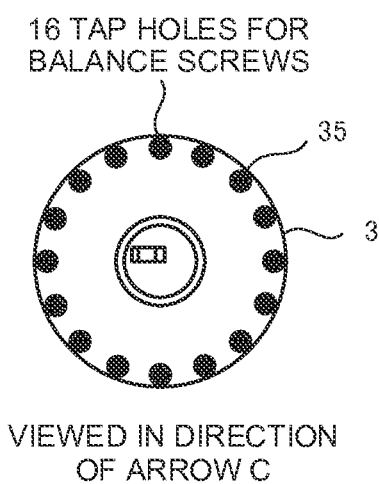
FIG. 16B is a diagram illustrating that 16 tap holes into which balance screws are fitted in a threaded manner are formed in an end surface of a tool holder of a collet chuck in FIG. 16A.

With reference to a flowchart in FIG. 15, description will be given which relates to a procedure for an adjustment process for the dynamic balance of the tool using the adjustment mechanism according to the present invention. The adjustment process for the dynamic balance can be executed by performing a series of operations using a ladder function and the like of the numerical controller. The procedure will be described in accordance with steps.

[Step SA01] The chuck suction force of the tool holder is weakened.
[Step SA02] The rotation speed of the spindle is increased.
[Step SA03] It is determined whether or not the position deviation of the Y axis is equal to or less than 30% of a collision detection threshold. When the position deviation is equal to or less than 30% of the collision detection threshold (YES), the process proceeds to step SA08. When the position deviation is not equal to or less than 30% of the collision detection threshold (NO), the process proceeds to step SA04.
[Step SA04] The direction and amount of deviation of the dynamic balance are calculated from the position deviation of the Y axis and the rotation accuracy of the spindle.
[Step SA05] A first projection used to correct the deviation is selected, and the tool holder is moved by driving respective axes to a position immediately before the position where the selected first projection collides against the second projection.
[Step SA06] The Y axis is moved to cause the first projection and the second projection to collide against each other, and the collision is detected.
[Step SA07] It is determined whether or not the position deviation has decreased. When the position deviation has decreased (YES), the process returns to step SA02. When the position deviation has not decreased (NO), the process returns to step SA04.
[Step SA08] It is determined whether or not the dynamic balance calculated from the position deviation is equal to or less than 10 mg and the f rotation speed is equal to or more than an operating rotation frequency. When the rotation speed is equal to or more than the operating rotation speed (YES), the process proceeds to step SA09. When the rotation speed is not equal to or more than the operating rotation speed (NO), the process returns to step SA02.
[Step SA09] The chuck suction force of the tool holder is maximized, and the adjustment process for the dynamic balance is ended.

In the above-described embodiments according to the present invention, the direction of deviation of the dynamic balance is detected. However, instead of the direction of the deviation, the amount of deviation of the dynamic balance may be exclusively detected and adjusted. This eliminates the need to predefine the relation between the first projection and the rotation angle of the spindle depicted in FIG. 8 (fourth embodiment). This method is particularly effective in the case where the tool holder is displaced in the rotation direction each time a collision is detected, preventing the rotation angle of the spindle and the phase of the first projection from being maintained.

As described above, a major feature of the adjustment of the dynamic balance according to the present invention is that the balance adjustment can be made with the spindle kept rotating. Correction can be made at any rotations ranging from low-speed rotations to high-speed rotations with no need to stop the rotation of the spindle. This allows the adjustment operation to be achieved in a short time. Furthermore, automating an operation of adding set screws with specified weights is difficult as is the case with the conventional technique. However, the use of the adjustment mechanism according to the present invention enables the adjustment of the dynamic balance to be easily automated.

Furthermore, the present invention can advantageously be applied to the adjustment of tool runout. The adjustment mechanism according to the present invention is particularly useful in the field of ultra-precision machining that needs precise adjustment of the dynamic balance or the tool runout.

The invention claimed is:

1. An adjustment mechanism for rotation runout and dynamic balance of a rotating tool that is attached to a spindle and is held by a tool holder, the adjustment mechanism comprising:
    a chuck which sucks the tool holder in a direction of a rotational axis of the spindle and which sucks the tool holder in a direction perpendicular to the direction of the rotational axis of the spindle;
    a first projection provided on an outer peripheral surface of the tool holder;
    a second projection provided on a plane formed by a trajectory of the first projection when the spindle is rotated; and
    a distance change element that enables any change in a distance from the rotational axis of the spindle to the second projection until the first projection and the second projection collide against each other, wherein
    the position of the tool holder is displaced if the first projection and the second projection collide with each other by an external force applied to the first projection,
    a plurality of the first projections are disposed on the outer peripheral surface of the tool holder so as to have different phases in a rotation direction,
    a plurality of rotation planes formed by the trajectories of the first projections is arranged so as not to overlap one another with the spindle kept rotating, and
    changing a relative position between the spindle and the second projection enables a position to be set where any one of the first projections and the second projection collide against each other.

2. The adjustment mechanism for rotation runout and dynamic balance of the rotating tool according to claim 1, wherein a number of the first projection is four, and the first projections have phases different from one another by 90° in the rotation direction.

3. The adjustment mechanism for rotation runout and dynamic balance of the rotating tool according to claim 1, wherein the spindle and the dynamic balance adjustment mechanism are mounted in a machine tool to allow any change in a relative distance between the first projection and the second projection using a translation axis or a rotational axis of the machine tool.

4. The adjustment mechanism for rotation runout and dynamic balance of the rotating tool according to claim 3, wherein
    the machine tool is controlled by a numerical controller, and
    the numerical controller comprises an adjustment section which calculates a magnitude of dynamic balance of the rotating tool from a magnitude of position deviation of the translation axis or the rotational axis, calculates a direction in which the dynamic balance deviates, from the rotation angle of the spindle and a phase difference in the position deviation, and automatically controls the respective axes to adjust a position of the tool holder so as to minimize the magnitude of the dynamic balance.

5. The adjustment mechanism for rotation runout and dynamic balance of the rotating tool according to claim 3, wherein the machine tool is controlled by a numerical controller and comprises a sensor that measures an amount and a phase of rotation runout of the rotating tool, and the numerical controller comprises an adjustment section which calculates a direction in which the dynamic balance deviates, from the rotation angle of the spindle and the phase of the rotation runout, and automatically controls the respective axes to adjust a position of the tool holder so as to minimize an amount of the rotation runout.

6. The adjustment mechanism for rotation runout and dynamic balance of the rotating tool according to claim 1, wherein the chuck is a vacuum chuck, and the adjustment mechanism further comprises a degree-of-vacuum change unit that enables a degree of vacuum of the vacuum chuck to be optionally changed, and reduces the degree of vacuum when the rotation runout or dynamic balance of the rotating tool is adjusted.

7. The adjustment mechanism for rotation runout and dynamic balance of the rotating tool according to claim 1, wherein the chuck is a magnetic chuck that generates a magnetic force using a permanent magnet, and the adjustment mechanism further comprises a mechanism that feeds an air pressure to an attachment surface of the tool holder and a mechanism that enables the air pressure to be optionally changed, and increases the air pressure when the rotation runout or dynamic balance of the rotating tool is adjusted.

8. The adjustment mechanism for rotation runout and dynamic balance of the rotating tool according to claim 4, wherein the numerical controller is connected to a collision detection unit that detects a collision between the first projection and the second projection based on the position deviation.

* * * * *